(12) United States Patent
Maas

(10) Patent No.: US 7,622,706 B2
(45) Date of Patent: Nov. 24, 2009

(54) SENSOR CABLE AND MULTIPLEXED TELEMETRY SYSTEM FOR SEISMIC CABLES HAVING REDUNDANT/REVERSIBLE OPTICAL CONNECTIONS

(75) Inventor: Steven J. Maas, Pflugerville, TX (US)

(73) Assignee: PGS Geophysical AS, Lysaker (NO)

( * ) Notice: Subject to any disclaimer, the term of this patent is extended or adjusted under 35 U.S.C. 154(b) by 16 days.

(21) Appl. No.: 12/009,516

(22) Filed: Jan. 18, 2008

(65) Prior Publication Data

US 2009/0185170 A1 Jul. 23, 2009

(51) Int. Cl.
*G01J 1/04* (2006.01)
*G01J 1/42* (2006.01)
*G01J 5/08* (2006.01)

(52) U.S. Cl. .................................. 250/227.14; 385/12

(58) Field of Classification Search ............ 250/227.14, 250/227.16, 227.18, 227.27; 385/12, 13, 385/37
See application file for complete search history.

(56) References Cited

U.S. PATENT DOCUMENTS

| | | | |
|---|---|---|---|
| 4,648,083 A | 3/1987 | Giallorenzi | |
| 5,696,857 A | 12/1997 | Frederick | |
| 5,866,898 A | 2/1999 | Hodgson et al. | |
| 6,591,025 B1 * | 7/2003 | Siems et al. | 250/227.14 |
| 6,850,461 B2 | 2/2005 | Maas et al. | |
| 6,982,925 B2 | 1/2006 | Maas et al. | |
| 7,366,055 B2 | 4/2008 | Rønnekleiv et al. | |

* cited by examiner

*Primary Examiner*—Seung C Sohn
(74) *Attorney, Agent, or Firm*—E. Eugene Thigpen; Richard A. Fagin

(57) ABSTRACT

An optical sensor cable includes at least one light source fiber extending substantially the entire length of the cable. A plurality of optical sensors are functionally coupled at an input thereof to the at least one light source fiber. At least one signal return fiber extends substantially along the entire length of the cable and is functionally coupled to an output of each of the optical sensors. The at least one source light fiber and the at least one signal return fiber are configured to be coupled at either end thereof to a respective one of a light source and a photodetection device.

26 Claims, 6 Drawing Sheets

SENSOR CABLE AND MULTIPLEXED TELEMETRY SYSTEM FOR SEISMIC CABLES HAVING REDUNDANT/REVERSIBLE OPTICAL CONNECTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of optical sensing systems. More specifically, the invention relates to optical sensing systems using various multiplexing techniques to operate a plurality of individual seismic sensors on a sensor cable.

2. Background Art

Optical systems for sensing physical properties such as acceleration, motion and/or pressure are used for, among other purposes, sensing seismic energy from the Earth's subsurface. The seismic energy may be naturally occurring, or may be imparted by a seismic energy source for the purpose of performing reflection seismic surveys. Detecting seismic energy may include detecting pressure, or changes in pressure, in a body of water. A sensor used to measure such changes in pressure is known as a hydrophone. Detecting seismic energy also includes detecting motion on or near the Earth's surface, or in a body of water. Motion may be detected using devices known as geophones. Geophone signals are related to velocity of motion. Accelerometers, which produce signals related to the time derivative of velocity of motion (acceleration), are also used to detect seismic energy. Sensors known in the art which respond to the foregoing physical parameters generate an optical signal in response to the detected physical parameter. The optical signal may be, for example, a change in wavelength, a change in phase or an interference pattern in response to changes in the physical parameter. Means for distributing light to and collecting the light from a plurality of the optical sensors is referred to as optical telemetry. Many individual optical sensors can be multiplexed from relatively few light source and signal return optical fibers using optical telemetry systems known in the art.

Generally, optical telemetry known in the art includes time division, frequency division and/or wavelength division multiplexing (TDM, FDM and/or WDM, respectively). A selected length of optical fiber ultimately affixed to an optical sensing device carries light from a source, which is distributed to the various optical sensors in a sensing system. The light in the sensor experiences a change or phase shift related to the physical property being measured. The change in optical characteristics of the optical fiber that causes changes in the properties of the applied light may be detected by one of a number of different optical measurement techniques. Optical signals from the sensors are then collected and returned to a receiving device for demultiplexing and analyzing the signals from each optical sensor.

A fiber optic telemetry disclosed, for example, in U.S. Pat. No. 4,648,083 issued to Gialorenzi is a typical fiber optic system using both FDM and WDM telemetry. The fiber optic telemetry disclosed in the '083 patent includes optical fiber that is distributed to and from an optoelectronic cabinet. Individual sensor "channels" are multiplexed in an M×N fiber distribution and collection FDM and/or WDM arrangement. A number "M" of input fibers and a number "N" of signal return fibers are used to operate a number M×N number of individual optical channels. U.S. Pat. No. 5,696,857 issued to Frederick discloses a WDM/FDM scheme using WDM tap couplers to drop an individual wavelength to a group of optical sensors. U.S. Pat. No. 5,866,898 issued to Hodgson discloses a scheme that use distribution and return buses with optical amplifiers to maintain suitable power levels in the returned optical signals.

U.S. Pat. No. 6,850,461 issued to Maas et al. and assigned to the assignee of the present invention discloses a seismic cable system using WDM and/or FDM techniques in which optical splitting of source light from an input bus to individual sensors and recombination of signals from the individual sensors are made in discrete modules, such that optical splicing and splitting or recombining components are mechanically isolated from other portions of the cable. Such arrangement is intended to improve the reliability of seismic sensing systems by isolating failure prone system elements to easily replaceable modules.

Seismic cables are subjected to rough handling and severe environmental conditions, sometimes resulting in breakage of one or more optical fibers in the cable, notwithstanding well designed construction. In some cases, breakage of an input bus fiber or a return bus fiber in a sensor cable such as the ones described in the above referenced patents may result in loss of signals from a significant portion, or even all of the sensors in an individual seismic sensor cable.

What is needed is a seismic sensing cable that provides redundant light source and signal return bus capability to increase survivability of the cable in the event of bus fiber failure.

SUMMARY OF THE INVENTION

An optical sensor cable according to one aspect of the invention includes at least one primary light source fiber extending substantially the entire length of the cable. At least one auxiliary light source fiber also extends substantially the entire length of the cable. A plurality of optical sensors are functionally coupled at an input thereof to each of the at least one primary light source fiber and the at least one auxiliary light source fiber. At least one primary signal return fiber extends substantially along the entire length of the cable and is functionally coupled to an output of each one of the optical sensors. The cable includes at least one auxiliary signal return fiber extending substantially along the entire length of the cable and functionally coupled to an output of each of the optical sensors.

In some examples, the at least one primary signal return fiber includes at least one optical amplifier arranged so that its output is in a first direction along the primary signal return fiber. In some examples, the at least one auxiliary signal return fiber includes at least one optical amplifier arranged so that its output is in a direction opposed to the first direction.

An optical sensing system according to another aspect of the invention includes at least two sensor cables. Each of the sensor cables includes at least one primary light source fiber extending substantially the entire length of the cable and at least one auxiliary light source fiber extending substantially along the entire length of the cable. Each sensor cable includes a plurality of optical sensors functionally coupled at an input thereof to each of the primary light source fiber and the auxiliary light source fiber. Each sensor cable also includes at least one primary signal return fiber extending substantially along the entire length of the cable and functionally coupled to an output of each of the optical sensors. In some examples, the at least one primary signal return fiber includes at least one optical amplifier therein arranged with its output in a first direction. Each sensor cable includes at least one auxiliary signal return fiber extending substantially along the entire length of the cable and functionally coupled to an output of each of the optical sensors. In some examples, the at least one auxiliary signal return fiber includes at least one optical amplifier therein arranged with an output thereof in a direction opposed to the first direction. The system also includes a jumper cable configured to couple to a distal end of each of the at least two sensor cables. The jumper cable includes therein optical fibers configured to optically couple a distal end of the at least one primary source light fiber in a first one of the cables to a distal end of the at least one auxiliary source light fiber in a second one of the cables. The jumper cable also includes optical fibers configured to optically couple a distal end of the at least one signal return fiber in a first one of the cables to a distal end of the auxiliary signal return fiber in the second one of the cables.

An optical sensor cable according to another aspect of the invention includes at least one light source fiber extending substantially the entire length of the cable. A plurality of optical sensors are functionally coupled at an input thereof to the at least one light source fiber. At least one signal return fiber extends substantially along the entire length of the cable and is functionally coupled to an output of each of the optical sensors.

The at least one source light fiber and the at least one signal return fiber are configured to be coupled at either end thereof to a respective one of a light source and a photodetection device.

An optical sensor cable system according to another aspect of the invention includes at least one pair of optical fibers extending substantially along a length of a respective cable. A plurality of fiber Bragg grating sensors is disposed at spaced apart positions along each of the optical fibers. A modulated light source is functionally coupled to one end of each optical fiber. A photodetector and a demodulator are functionally coupled to a same end of each optical fiber. An optical interconnecting cable is coupled between an end of each optical fiber opposite to the end thereof coupled to the light source and the photodetector.

Other aspects and advantages of the invention will be apparent from the following description and the appended claims.

DETAILED DESCRIPTION

An optical sensor cable and a system according to various aspects of the invention are generally bi-directional, meaning that they can be coupled to a data acquisition device and/or to subsequent cables (or segments thereof) in either direction. An optical sensor cable and a system according to various aspects of the invention may also have redundant source light and signal return paths, such that in the event of failure of a source light fiber or a signal return fiber, or failure of a portion of a fiber, signal acquisition may still be performed using substantially all the sensors in the cable and system. Various examples of a sensor cable and system will now be described that may include such aspects of the invention.

Figure 1:
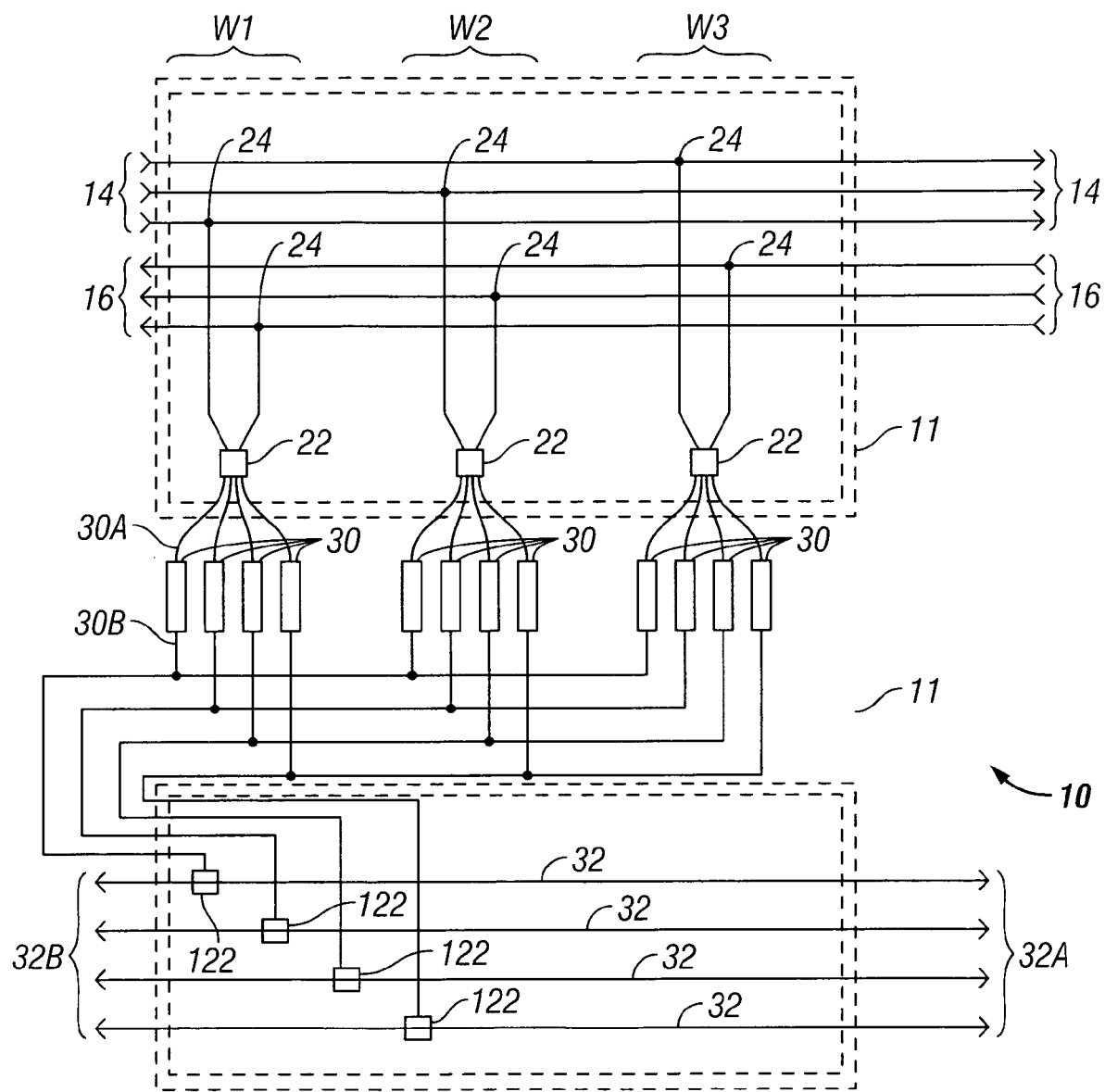
FIG. 1 shows an example combination FDM/WDM telemetry system for a section in an array of seismic sensors.

An example sensor cable that can be used with wavelength division multiplexed ("WDM") and frequency division multiplexed ("FDM") optical telemetry is shown schematically in FIG. 1. A sensor cable 10 may be a seismic sensor streamer arranged to be towed in a body of water by a seismic survey vessel. The cable 10 may also be a land-based seismic sensor cable deployed on the land surface, or an ocean bottom seismic sensor cable ("OBC") deployed on the bottom of a body of water. The seismic sensor cable 10 can include one or more source light fibers 14 that may ultimately be coupled to a light source such as a laser diode and an associated modulator (as will be explained with reference to FIG. 2). Such light source may be disposed, for example, on a seismic vessel (not shown in the figures) or in a seismic recording system (50 in FIG. 2). The source light fibers 14 generally extend over the entire length of the sensor cable 10 and may include connectors (not shown separately) of types known in the art for coupling an optical sensor cable to another device.

The seismic sensor cable 10 may also include one or more auxiliary source light fibers 16 extending substantially along the entire length of the cable 10. The purpose and configuration of the auxiliary source light fibers 16 will be further explained below. The seismic sensor cable 10 may include a plurality of optical seismic sensors, such as optical hydrophones and/or optical accelerometers (particle motion sensors). The seismic sensors are shown generally at 30. As shown in FIG. 1, the seismic sensors 30 may be arranged in groups, W1, W2, W3 disposed at spaced apart locations along the seismic sensor cable 10. In one example, each group W1, W2, W3 may include one optical hydrophone, and three, mutually orthogonally arranged optical particle motion sensors such as accelerometers. One example of a three-component optical accelerometer that may be used in some examples is described in U.S. Pat. No. 7,22,534 issued to Maas et al. and assigned to the assignee of the present invention. The seismic sensor cable 10 may include one or more signal return fibers 32 extending substantially along the entire length of the cable 10. The signal return fibers 32 are configured for returning optical signals from the seismic sensors 30 to the recording system (50 in FIG. 2) for decoding and interpretation. Devices for decoding and interpreting the signals from each of the optical sensors 30 are known in the art.

The optical seismic sensors 30 may be coupled at their input ends to the source light fibers 14 and to the auxiliary source light fibers 16. Output ends of the sensors 30 may be coupled to the signal return fibers 32. Such optical coupling may be performed using various optical couplings as will be explained below that enable separate interrogation of each one of the optical sensors 30. In the present example, which is not to be construed as limiting the scope of this invention, some or all of the optical couplings to and from the optical seismic sensors 30 may be disposed in a sealed housing that is coupled to one end or the other of the cable 10 using optical cable connectors. Collectively, the sealed housing (not shown separately) with optical coupling devices therein may be referred to as a "module" 11. One example of a seismic sensor cable that uses such modules is described in U.S. Pat. No. 6,982,925 issued to Maas et al. and assigned to the assignee of the present invention. A possible advantage of using such modules to enclose the optical couplings is to remove such couplings from the sensor cable 10, thus placing all the optical couplings within a sealed housing. Such placement may reduce incidence of sensor cable failure by water intrusion into the optical couplings, and may reduce cost and time to repair failed optical couplings by eliminating the need to open and service the sensor cable 10. In such examples using modules 11, the only components in the sensor cable 10 include the optical seismic sensors 30, their respective light source 30A and signal return 30B fibers, the source light fibers 14, the auxiliary source light fibers 16 and the signal return fibers 32. In FIG. 1, the placement of the optical couplings within the module 11 is shown by the dashed line boxes surrounding the various optical couplings.

Figure 2:
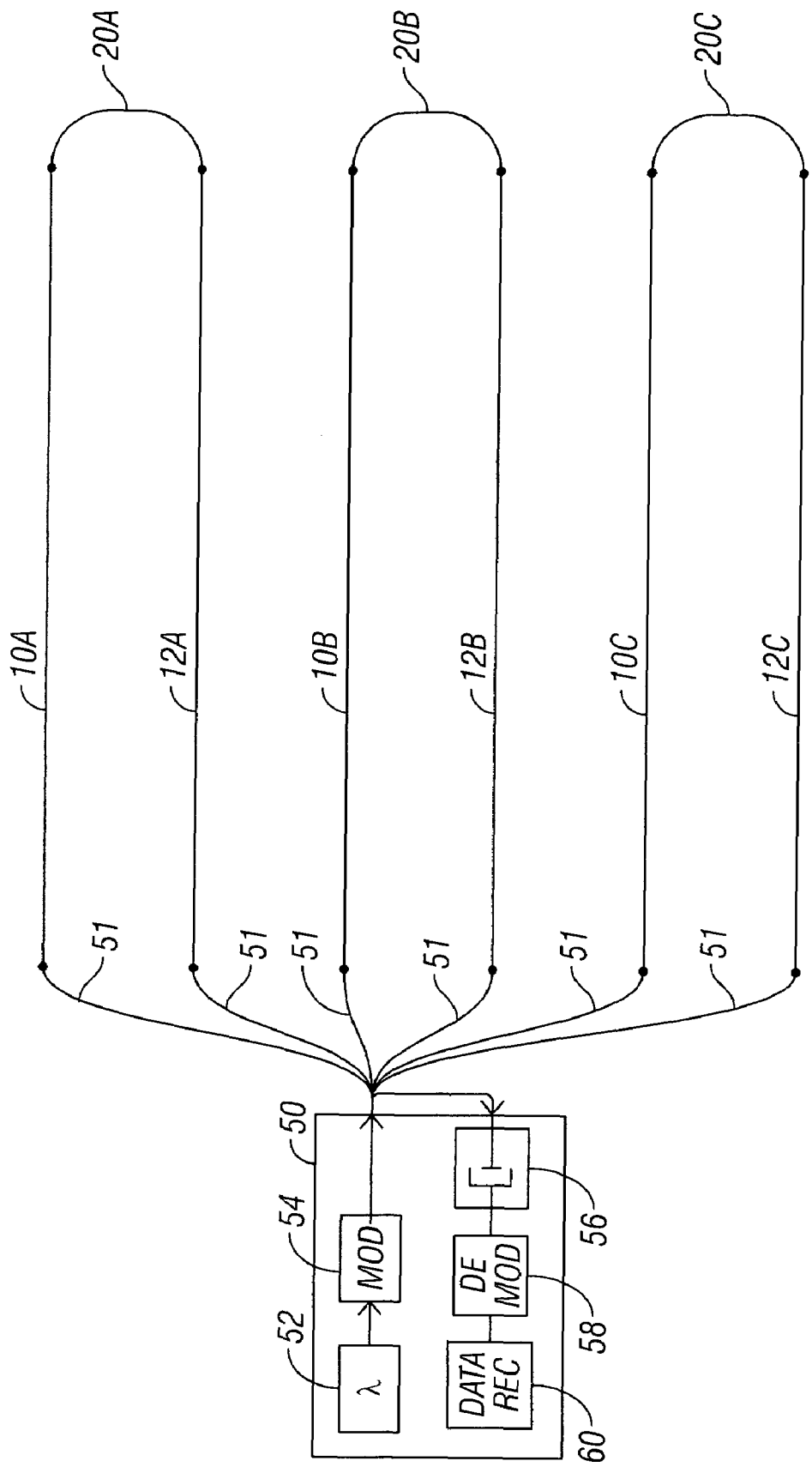
FIG. 2 shows an example system deployment of a plurality of sensor cables of the type shown in FIG. 1 or FIG. 1A.

The optical couplings for the seismic sensor cable 10 shown in FIG. 1 may be explained as follows. Each sensor group W1, W2, W3 may have associated therewith a respective wavelength drop 24 coupled to one of the source light fibers 14. The wavelength drops 24 are arranged so that light may travel through the wavelength drop 24 as it passes along the respective source light fiber 14 in a direction away from the light source (FIG. 2). The output of each wavelength drop 24 may be coupled to the input of an optical coupling 22 associated with each sensor group W1, W2, W3. The output terminals of each optical coupling 22 each may be coupled to the input fiber 30A of a respective seismic sensor 30. FIG. 1 also shows a corresponding wavelength drop 24 coupled to a respective one of the auxiliary source light fibers 16 and to one of the optical couplings 22. Such wavelength drops 24 may be coupled to the auxiliary source light fibers 16 so that light traveling in the opposite direction to that traveling along the source light fibers 14 is transmitted to the respective optical coupling 22. Therefore, the arrangement shown in FIG. 1 may provide source light to each optical coupling 22 over the source light fibers 14 if the light travels therealong in one direction. Source light traveling over the auxiliary source light fibers 16 in the opposite direction may be provided to the optical couplings 22.

In WDM/FDM telemetry, each source light fiber 14 may include source light at a plurality of different wavelengths. Each source light fiber 14 may include light at each of the plurality of wavelengths modulated at a single, distinct frequency. For example, the sensors 30 in group W1 are all actuated using the light from one wavelength drop 24 all having the same carrier frequency and the sensors 30 in group W2 are all actuated using the light from another wavelength drop 24 all having a different carrier frequency and the sensors 30 in group W3 are all actuated using the light from a third wavelength drop 24 all having another different carrier frequency. The signals generated by each sensor 30 may be recombined as shown in FIG. 1 with signals from sensors in the other sensor groups W1, W2, W3 modulated at a different frequency. The combined signals are transmitted to optical couplings 122 where they can be combined with light of a different wavelength from one or more adjacent sensor sections (see FIG. 1), such that all signals at a common modulation frequency, but at different wavelengths, may be combined. The combined signals from the sensors are transmitted to optical couplings 122, which may be disposed in the module 11. The arrangement in FIG. 1 includes two output terminals for each such optical coupling 122 coupled to a respective signal return fiber 32 so that output signals from each coupling 122 may be transmitted in both directions along a respective signal return fiber 32. Thus, optical signals from the respective sensors 30 are detectable at either end 32A, 32B of the signal return fibers 32.

The arrangement of the seismic sensor cable 10 shown in FIG. 1 therefore may be coupled to adjacent cable segments or to the seismic vessel (or recording system) in either direction and will operate correctly. As will be explained further below with reference to FIGS. 1A, 2 and 4, one end of the seismic sensor cable 10 may be coupled directly to, or to another device in the direction of recording system, and various devices may be coupled to the opposite end of the seismic sensor cable 10 to provide redundant source light and signal return paths in the event one or more of the source light fibers 14 and signal return fibers 32 becomes damaged or inoperable.

Figure 1A:
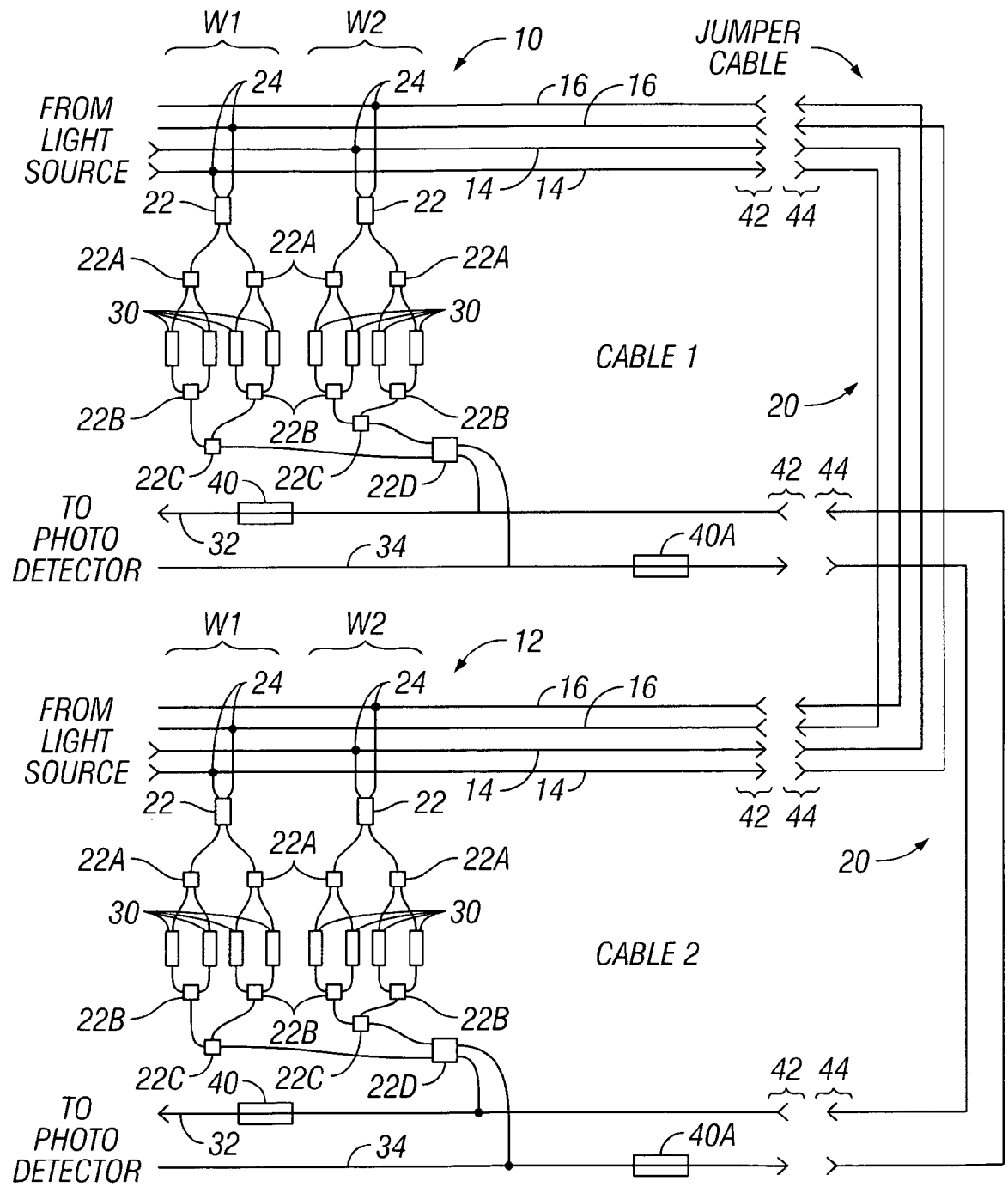
FIG. 1A shows an example of TDM/WDM telemetry system on two separate sensor cables.

An alternative arrangement shown in FIG. 1A may be used with time division multiplex ("TDM")/WDM telemetry. The arrangement shown in FIG. 1A can include a first seismic sensor cable 10 and a second seismic sensor cable 12. Each of the seismic sensor cables 10, 12 includes one or more source light fibers 14 extending along essentially the entire length of each seismic sensor cable 10, 12. Each source light fiber 14 may be coupled to a mono- or polychromatic (multiple wavelength) source of light (see the recording system 50 in FIG. 2). For simplicity of the illustration, FIG. 1A shows for each sensor cable 10, 12, two groups of seismic sensors 30. A first group of seismic sensors is designated by W1 and can operate using a first wavelength of light. Such first wavelength may be obtained from one of the source light fibers 14 using a wavelength drop 24. Output of the wavelength drop 24 is coupled to one input of an optical splitter or coupling 22. A second one of the inputs to the optical splitter 22 may be coupled, through a wavelength drop 24 having the same selected wavelength or a different wavelength as the one connected to the source light fiber 14, to an auxiliary or redundant source light fiber 16. Each seismic sensor cable 10, 12 may have one or more such auxiliary source light fibers 16.

The two outputs of the example optical splitter 22 may be coupled to respective inputs of two, second optical splitters 22A. Outputs of the two, second optical splitters 22A may each be coupled to an input end of an optical sensor 30, such as an optical geophone, optical accelerometer or optical hydrophone. The optical sensors 30 cause a change in a characteristic of the imparted light in response to detected pressure change (for a hydrophone) or motion (such as for a geophone or accelerometer). Such change may be, for example, a phase shift as is known in the art. Each optical sensor 30 may have an associated delay loop (not shown) as would ordinarily be used with TDM telemetry.

The output of each optical sensor 30 can be coupled to one input of an optical coupler 22B configured to combine the signals from two optical sensors 30 each with a different carrier frequency into a single output representing a combination of the signals from the two optical sensors coupled to the inputs of the coupler 22B. The single output of two of such optical couplers 22B may be coupled to the input of another, similarly configured optical coupler, so as to combine all the signals from the optical sensors ultimately coupled thereto. Such arrangement may be repeated in a final optical coupling 22D. Output connections from the final optical coupling 22D will be further explained below.

The foregoing arrangement may be substantially replicated within any selected number of additional sensor groups disposed along each sensor cable 10, 12. One such group is shown at W2 in each of the sensor cables 10, 12. Such additional optical sensor group W2 typically operates on a different light wavelength than the first sensor group W1. Light having the different wavelength is obtained from one of the light source fibers 14 through a wavelength drop 24 effective at the different selected wavelength. The wavelength of light used in any particular sensor group will thus be related to the wavelength of the respective wavelength drop 24 used to couple the input of the associated optical splitter 22 to the particular source light fiber 14. The example shown in FIG. 1A includes two such source light fibers 14, however the number of such source light fibers shown herein is not intended as a limit on the scope of this invention.

The output of the final optical coupling 22D associated with each sensor group W1, W2 includes two outputs. In the sensor first cable 10 in FIG. 1A such output could be associated with, for example, two different wavelengths (W1, W2). In the second cable 12 in FIG. 1 different wavelengths can be used for the different groups W1, W2. One output, which includes the combined output signals from all the sensors 30 in a sensor group (e.g., W1 or W2) is coupled to a primary signal return fiber 32. The primary signal return fiber 32 is ultimately optically coupled to a photodetector or demultiplexer and then to one or more photodetectors (shown in FIG. 2). The primary signal return bus fiber 32 may include one or more optical amplifiers 40 therein between the output of one or more of the final optical couplers 22D associated with each sensor group W1, W2 and an optical input to the primary signal return fiber 32 return from a succeeding final optical coupling 22D. "Succeeding" as used in the present context means in the direction of the photodetector (see FIG. 2). The optical amplifier(s) 40 associated with the primary signal return fiber 32 accept optical input from direction of the right hand side thereof in the illustration in FIG. 1A, and apply the output thereof toward the left hand side of the primary signal return fiber 32. For purposes of explaining the invention, a recording system (see FIG. 2) may be functionally coupled to the left hand end of each sensor cable 10, 12 and include therein a light source and photodetector (see FIG. 2).

The other output of the final optical coupling 22D associated with each sensor group W1, W2. may be optically coupled to an auxiliary signal return fiber 34. The auxiliary signal return fiber 34 may include one or more optical amplifiers 40A along its length. The optical amplifiers 40, 40A may be erbium doped fiber amplifiers ("EDFA") of types well known in the art connected to a "pump light" source to provide amplification energy. The pump light may be obtained from one of the source light fibers or a different fiber (not shown) extending along each sensor cable 10, 12. As explained above, each sensor cable 10, 12 includes one or more auxiliary source light fibers 16 extending along its length. The second input of each of the optical splitters 22 may be coupled to a respective one of the auxiliary source light fibers 16 through an appropriate wavelength drop 24. For each sensor group W1, W2, the associated wavelength drop 24 coupled to the auxiliary source light fiber 16 will typically have the same wavelength as the wavelength drop 24 coupled to the corresponding source light fiber 14. Thus, the first optical splitter 22 associated with each sensor group W1, W2 in each sensor cable 10, 12, can obtain source light from either the source light fiber 14 or the auxiliary source light fiber 16.

In the example shown in FIG. 1A, a jumper cable 20 can include optical fibers configured to make optical connections between the distal ends (distal meaning with reference to the light source and photodetector-coupled-end) of the fibers extending along the length of the first sensor cable 10 to the distal ends of certain corresponding fibers in the distal end of the second sensor cable 12. The distal end of each of the sensor cables 10, 12 may include optical couplings 42 associated with a mechanical and optical connector (not shown) that make optical connection with mating optical couplings 44 in a corresponding connector (not shown) the jumper cable 20. One such optical coupling and optical cable connector system are described, for example, in U.S. Pat. No. 6,827,597 issued to Metzbower et al. and assigned to the assignee of the present invention.

The optical connections made between the distal ends of each of the fibers in each sensor cable may be described as follows. The first sensor cable 10 source light fibers 14 are optically coupled at their distal ends (through the fibers in the jumper cable 20) to the distal end of the auxiliary source light fibers 16 in the second sensor cable 12. Thus, if one or more of the source light fibers 14 in the second cable 12 becomes damaged, or if the light source coupled thereto fails, source light will be available for the sensor groups W1, W2 in the second sensor cable 12 by reason of the connection of one input of each of the optical splitters 22 to one of the auxiliary source light fibers 16 in the second sensor cable 12. The auxiliary source light fiber 16 in the second cable 12, as may be readily inferred from the above description, obtains light input at its distal end from the distal end of the source light fibers 14 in the first cable 12 by the optical connections made through the optical fibers in the jumper cable 20.

As shown in FIG. 1A, the jumper cable 20 can also be configured to include optical fibers making corresponding optical connection from the distal ends of the source light fibers 14 in the second sensor cable 12 to the distal ends of the auxiliary source light fibers 16 in the first sensor cable 10. Thus, if one or more of the source light fibers 14 in the first sensor cable 10 become damaged, source light may be obtained to operate the sensor groups (e.g., W1, W2) in the first sensor cable 10 by light entering the auxiliary source light fibers 16 from the distal end of the first sensor cable 10. Such light is obtained from the distal ends of the source light fibers 14 in the second sensor cable 12 using the optical fiber connections in the jumper cable 20.

The above configuration provides redundant light source paths for each of two associated sensor cables in the event of failure of one or more source light fibers 14. As will be explained below, a redundant path may be provided for optical signal return from each of two associated sensor cables using one or more auxiliary signal return fibers in each sensor cable.

As explained above, the two outputs of each final optical coupling 22D in each sensor cable 10, 12 are coupled to, respectively, a primary signal return fiber 32 and an auxiliary signal return fiber 34. In the example shown in FIG. 1A, the signals imparted to the auxiliary signal return fiber 34 in the first sensor cable 10 can be amplified, e.g., using an optical amplifier 40A, arranged in the direction of the distal end of the auxiliary signal return fiber 34, such that the optical amplifier 40A output is in the direction of the distal end of the auxiliary signal return fiber. The jumper cable 20 may include optical fibers to couple the distal end of the auxiliary signal return fiber 34 in the first sensor cable 10 to the distal end of the primary signal return fiber 32 in the second sensor cable 12.

Correspondingly, an auxiliary signal return fiber 34 in the second sensor cable 12 may be similarly arranged and have one or more optical amplifiers 40A arranged in the same manner the auxiliary signal return fiber 34 as in the first sensor cable 10. Optical fiber(s) in the jumper cable 20 may couple the distal end of the auxiliary signal return fiber 34 in the second sensor cable 12 to the distal end of the primary signal return fiber in the first sensor cable 10.

As shown in FIG. 1A, the primary signal return fiber 32 in each cable 10, 12 can include one or more optical amplifier(s) 40 having signal output in the direction of the near (in the direction of the photodetector or demultiplexer) end of the primary signal return fiber 32. Thus, if the signal return fiber 32 in the first sensor cable 10 becomes damaged, optical signals from the sensors in the first sensor cable 10 may be returned to the photodetector (FIG. 2) through a redundant signal return path. Such redundant return path is provided by the auxiliary signal return fiber 34 in the first sensor cable 10 coupled at its distal end to the distal end of the primary signal return fiber 32 in the second sensor cable 12. Corresponding optical interconnections between the distal end of the auxiliary signal return fiber 34 in the second sensor cable 12 and the primary signal return fiber 32 in the first sensor cable 10 may also be made through the jumper cable 20.

It should also be clearly understood that the example implementation shown in FIG. 1A, in which the jumper cable 20 is a separate cable removably connectable to the ends of each of the first sensor cable 10 and the second sensor cable 12, is only one possible implementation of the interconnections shown between the cables in FIG. 1A. It is within the scope of the present invention to provide a single optical sensor cable including all the elements of the first sensor cable 10, the second sensor cable 12 and the jumper cable 20 in a single physical cable. Accordingly, the term "jumper cable" as used herein is intended to mean both a separate cable element and an integral cable component of a single cable. Correspondingly, the first and second sensor cables may be segments of a single, integral cable. It should also be clearly understood that the jumper cable shown in FIG. 1A may be used with pairs of sensor cables configured for WDM/FDM telemetry as shown in FIG. 1.

In some examples, it may be desirable to configure each sensor cable 10, 12 according to the modularized configuration described in U.S. Pat. No. 6,982,925 issued to Maas et al. and assigned to the assignee of the present invention. In such configuration, the wavelength drops 24, optical splitters 22, 22A, the optical couplings 22B, 22D and any optical amplifier 40 associated with each sensor group W1, W2 are enclosed in a pressure resistant housing having optical/mechanical connectors on the ends thereof configured to mate with corresponding connectors on one or more sensor sections of such cable. The sensor sections include the optical sensors 30 and "through" segments of the source and signal return fibers 14, 16, 32, 34, respectively. See, e.g., FIG. 2 of the '925 patent. In such configuration, all optical connections to the source light and return fibers, and all optical splitters and couplers are disposed within discrete housings, such that in the event of component failure it is possible to repair the cable by replacing the one of the housings having the defective component. Such possible advantages are well described in the Maas et al. '925 patent, which is incorporated herein by reference.

Figure 4:
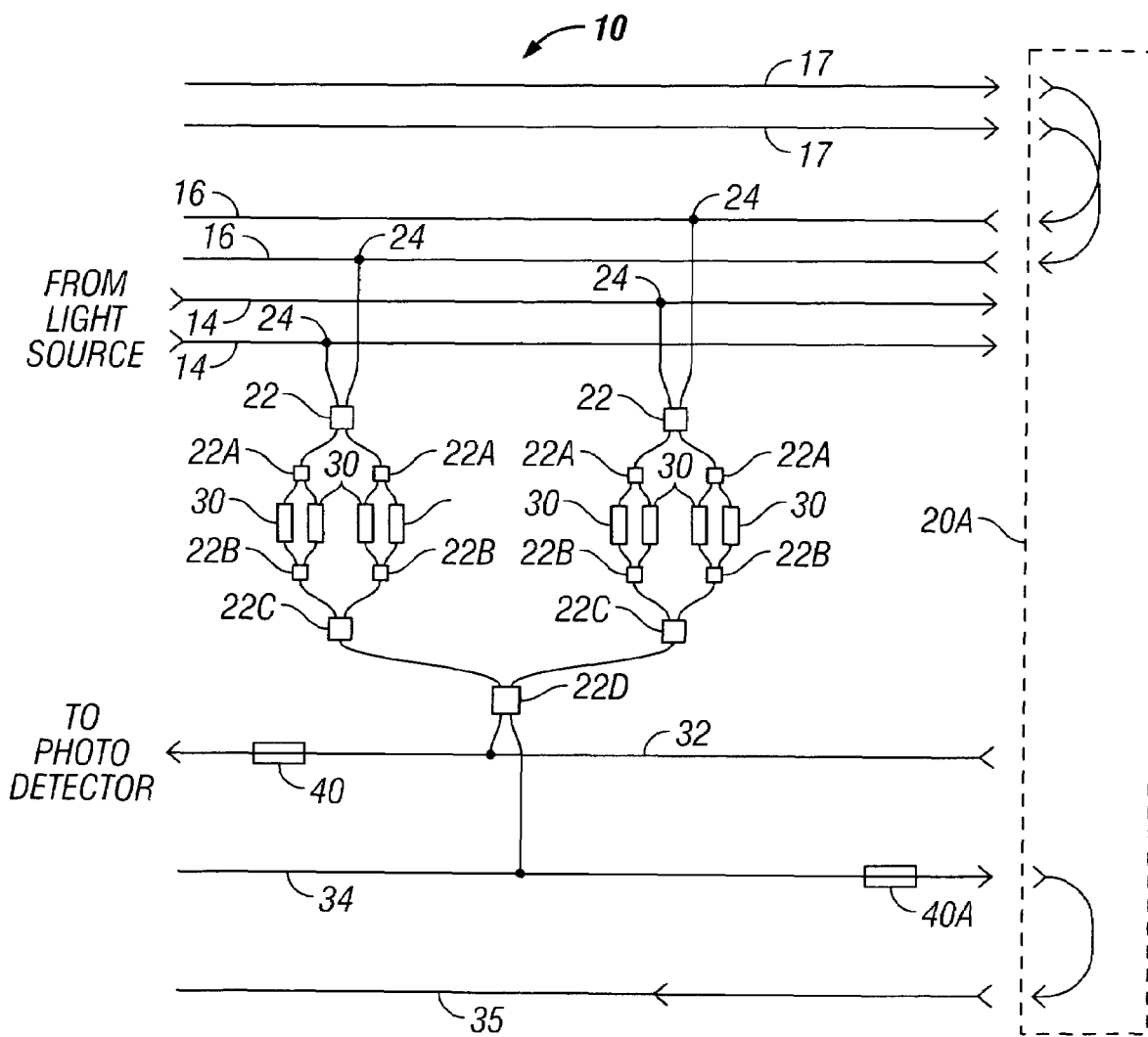
FIG. 4 shows a configuration of only one sensor cable adding spare fibers to provide a redundant path.

In some circumstances it may not be desirable to couple the distal ends of two such sensor cables using the jumper cable shown in FIG. 1A. In such circumstances, and referring to FIG. 4, a sensor cable 10 may be configured substantially as shown in and explained with reference to FIG. 1A. In FIG. 4, the distal end of the sensor cable 10 may be closed by a "bull plug" 20A that can include optical fibers configured to make the interconnections shown in FIG. 1A, or as shown in corresponding FIG. 5, just terminate the optical path of each optical fiber in the sensor cable 10.

It is also within the scope of the present invention for a first plurality of sensor cables configured as shown for the first sensor cable (10 in FIG. 1A) to be connected end to end (in optical series), laid out in parallel with a second plurality of sensor cables connected in optical series, each such cable configured as the second sensor cable shown in FIG. 1A. Such first and second plurality of sensor cables may be joined at their distal ends by a jumper cable such as shown at 20 in FIG. 1A.

It will also be appreciated by those skilled in the art that the cable configuration shown in FIG. 1A or FIG. 4 can be connected to the recording system (not shown) at the opposite end to that explained with reference to FIGS. 1A and 4 in the event a "lead in" portion of the cable becomes damaged. Because each sensor cable includes a primary source light path in which source light travels in a first direction and a redundant source light path having source light that travels in the opposite direction, it is possible to reverse connection to the recording system and maintain source light to each of the sensor groups (e.g. W1 and W2 in FIG. 1A). Correspondingly, because each cable includes a primary signal return fiber and an auxiliary return fiber each conducting optical signals and having amplification in opposite directions, it is possible to reverse the connection of such cable to the recording system (not shown).

Another example of a sensor cable including auxiliary source light fibers and signal return fibers is shown in FIG. 4. In FIG. 4, the auxiliary source light fibers are shown generally at 17 and an auxiliary signal return fibers are shown at 35.

Figure 5:
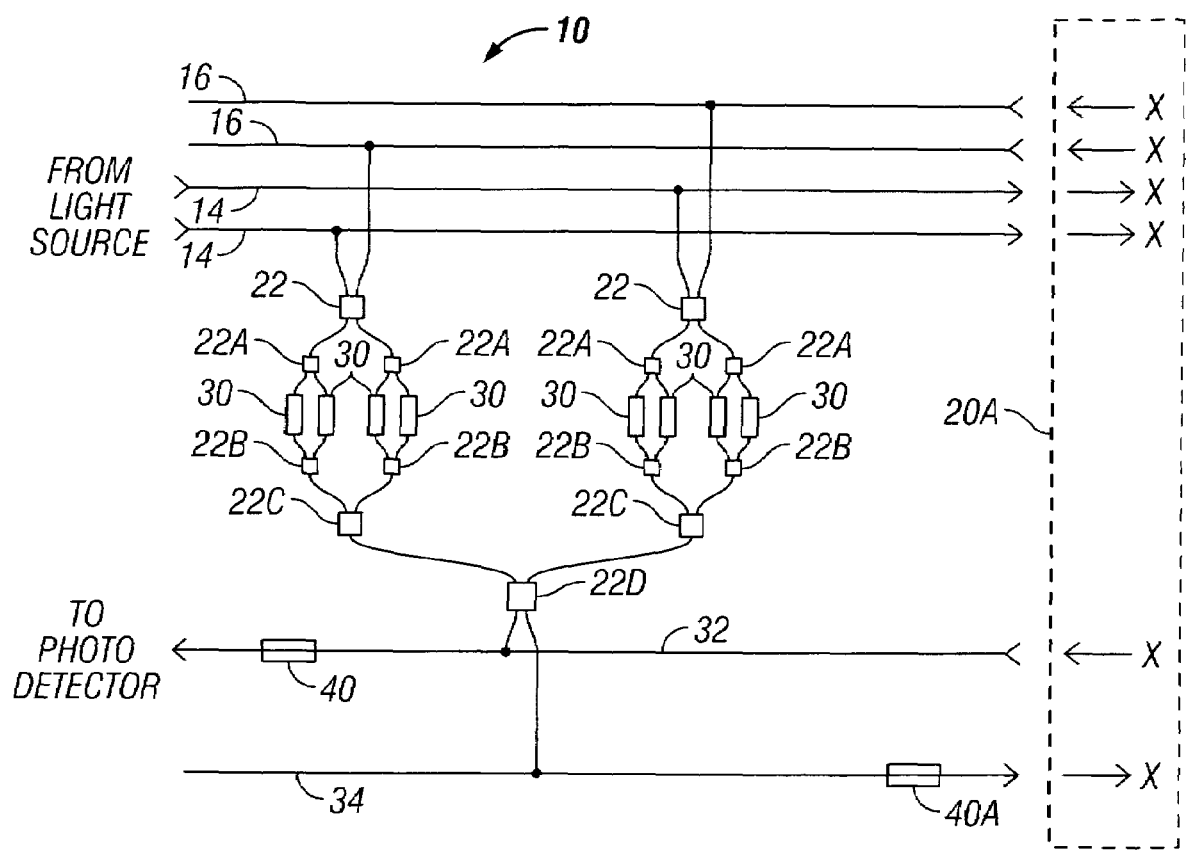
FIG. 5 shows another example of a bidirectional TDM/WDM telemetry system for an array of seismic sensors.

It should be clearly understood that the arrangement of sensor cables explained with reference to FIG. 1A, and FIG. 4 may be substituted with the sensor cable arrangement shown in FIG. 1. Thus, the sensor cable arrangement shown in FIG. 1 may also be used in multiple cable arrangements with redundant light source and signal return paths, or may include additional signal return fibers and couplings at a distal end for connection to a bull plug such as shown in FIG. 4 or FIG. 5. Accordingly, the invention is not limited in scope to any particular sensor arrangement or type of optical signal telemetry. It should also be clearly understood that the arrangement in FIG. 1 which does not include optical amplifiers in the signal return fibers is equally within the scope of this invention as the examples shown in FIG. 1A, FIG. 3, FIG. 4 and FIG. 5 that include such optical amplifiers.

An example layout of sensor cables and a recording system for seismic data acquisition is shown in FIG. 2. The layout in FIG. 2 can include three first sensor cables, 10A, 10B, 10C each of which may be configured substantially as explained with reference to FIG. 1A. The layout can include three second sensor cables 12A, 12B, 12C each also arranged substantially as explained with reference to FIG. 1. A near end of each sensor cable 10A, 12A, 10B, 12B, 10C, 12C may be coupled through a respective lead in cable 51 to a recording system 50.

The recording system may include a polychromatic light source 52 coupled through a modulator 54 to provide a combined WDM/FDM or WDM/TDM signal telemetry source for interrogation if each individual sensor in each of the six sensor cables. The output of the modulator 54 may be coupled by optical fibers (not shown separately) in each lead in cable 51 to the source light fibers (14 in FIG. 3) in each sensor cable. Signal return from the sensor cables may be coupled to a photodetector 56 in the recording unit 50 through respective signal return fibers (not shown separately) in each lead in cable 51 optically coupled to the primary signal return fiber(s) (32 in FIG. 1A) in each sensor cable.

Signals from the photodetector 56 may be coupled to a demodulator 58, which can generate electrical signals corresponding to the optical signals applied to the photodetector 56 from each of the individual sensors (30 in FIG. 1A). The demodulated signals may be recorded, such as in a time indexed record, made in a recording device 60. The recording device may make analog, or preferably digital recordings corresponding to the signal amplitude with respect to time at each sensor. As will be appreciated by those skilled in the art, such time indexed recordings are typically indexed with respect to actuation times of a seismic energy source (not shown).

The distal end of each first sensor cable 10A, 10B, 10C is coupled to the distal end of each corresponding second sensor cable 12A, 12B, 12C using respective jumper cables 20A, 20B, 20C.

The number of first sensor cables, second sensor cables and associated jumper cables shown in FIG. 2 is provided to illustrate the principle of the invention and is not intended to limit its scope.

Figure 3:
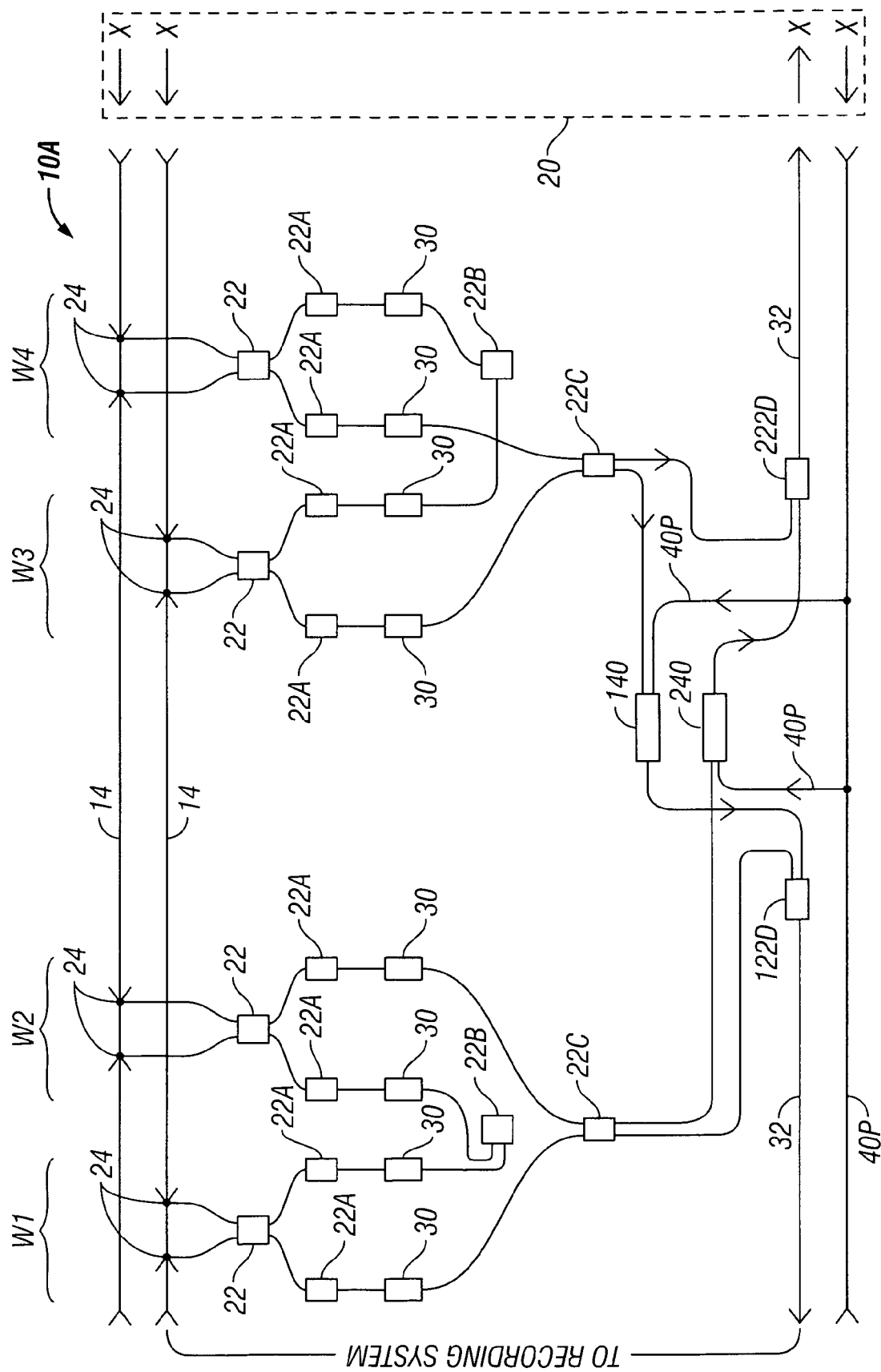
FIG. 3 shows a configuration of only one sensor cable using similar optical fibers as shown in FIG. 1 providing bidirectional operation.

Another example of a telemetry system using a single cable that may be coupled to a recording system in either direction, and using wavelength division multiplex/frequency division multiplex (WDM/FDM) telemetry is shown in FIG. 3. The sensor cable 10A includes source light optical fibers shown at 14. Each of four groups of optical sensors W1, W2, W3, W4 may be coupled to the source light fibers 14 using wavelength drop filters 24. Each wavelength drop filter 24 associated with a particular group of sensors W1 through W4 may transmit a particular wavelength of light and block transmission of other wavelengths or reflect the other wavelengths into a different fiber). In the example shown in FIG. 3, each sensor group W1, W2, W3, W4 may be coupled to one of the source light fibers 14 using two wavelength drop filters 24 of the same wavelength, coupled to a source light fiber 14 in opposed directions. Output of the two opposed wavelength drop filter 24 associated with each sensor group W1 through W4 may be coupled to an optical splitter 22. Thus, source light at the wavelength associated with each sensor group W1-W4 may be supplied to an input of an associated optical splitter 22 for each sensor group W1-W4 irrespective of which direction the cable 10A is connected to the recording system (50 in FIG. 2). Source light from the optical splitter 22 in each sensor group W1-W4 may be distributed to individual sensors 30 using optical splitters 22A, as in the example shown in FIG. 1 or FIG. 1A.

The example shown in FIG. 3 may be coupled to the recording system (FIG. 2) in either direction and operate essentially the same. The example in FIG. 3 may include a bull plug 20 coupled to an end of the cable 10A distal from the end of the recording system (50 in FIG. 2). The bull plug 20 may include optical terminations to exclude fluid and dirt from entering the ends of the cable 10A.

Optical sensor cables made according to the various aspects of the present invention may provide redundant source light and optical signal return path in the event of fiber failure or cable breakage. Optical sensor cables made according to the various aspects of the invention may also be connected to a recording system in either direction and still operate as intended.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical sensor cable, comprising:
   at least one primary light source fiber extending substantially the entire length of the cable;
   at least one auxiliary light source fiber extending substantially the entire length of the cable;
   a plurality of optical sensors functionally coupled at an input thereof to each of the primary light source fiber and the auxiliary light source fiber;
   at least one primary signal return fiber extending substantially along the entire length of the cable and functionally coupled to an output of each of the optical sensors; and
   at least one auxiliary signal return fiber extending substantially along the entire length of the cable and functionally coupled to an output of each of the optical sensors.

2. The optical sensor cable of claim 1 wherein the plurality of sensors are arranged in at least two groups, each group configured to operate on a unique wavelength of light, an input of the optical sensors in each group functionally coupled at an input end thereof to each of the primary light source fibers and the auxiliary light source fibers by a wavelength drop having the unique wavelength associated with each group.

3. The optical sensor cable of claim 1 wherein each of the groups of sensors comprises optical splitters configured to enable frequency division multiplex telemetry interrogation of each individual sensor in each of the groups of sensors.

4. The optical sensor cable of claim 1 wherein each of the groups of sensors comprises optical splitters configured to enable frequency division multiplex telemetry interrogation of each individual sensor in each of the groups of sensors.

5. The optical sensor cable of claim 1, wherein the at least one primary signal return fiber includes at least one optical amplifier therein arranged with an output thereof in a first direction, and wherein the at least one auxiliary signal return fiber includes at least one optical amplifier therein arranged with an output thereof in a direction opposed to the first direction.

6. The optical sensor cable of claim 4 wherein the at least one optical amplifier in each of the at least one primary and auxiliary signal return fibers comprises an erbium doped fiber amplifier.

7. The optical sensor cable of claim 1 further comprising a bull plug removably attachable to an end of the cable, the bull plug comprising optical devices configured to optically connect corresponding ends of the primary light source fiber to the auxiliary light source fiber, the optical devices configured to optically connect corresponding ends of the primary signal return fiber and the auxiliary signal return fiber.

8. The optical sensor cable of claim 1 wherein the optical sensors comprise optical seismic sensors.

9. An optical sensing system, comprising:
   at least two sensor cables, each sensor cable including at least one primary light source fiber extending substantially the entire length of the cable, each sensor cable including at least one auxiliary light source fiber extending substantially the entire length of the cable, each sensor cable including a plurality of optical sensors functionally coupled at an input thereof to each of the primary light source fiber and the auxiliary light source fiber, each sensor cable including at least one primary signal return fiber extending substantially along the entire length of the cable and functionally coupled to an output of each of the optical sensors, and each sensor cable including at least one auxiliary signal return fiber extending substantially along the entire length of the cable and functionally coupled to an output of each of the optical sensors; and
   a jumper cable configured to couple to a distal end of each of the at least two sensor cables, the jumper cable including therein optical fibers configured to optically couple a distal end of the at least one primary source light fiber in a first one of the cables to a distal end of the at least one auxiliary source light fiber in a second one of the cables, the jumper cable including therein optical fibers configured to optically couple a distal end of the at least one signal return fiber in a first one of the cables to a distal end of the auxiliary signal return fiber in the second one of the cables.

10. The system of claim 8 wherein the jumper cable includes optical fibers configured to optically couple the distal end of the at least one primary light source fiber in the second one of the cables to a distal end of the at least one auxiliary source light fibers in the first one of the cables, the jumper cable including optical fibers configured to optically couple the distal end of the at least one primary signal return fiber in the second one of the cables to a distal end of the at least one auxiliary signal return fiber in the first one of the cables.

11. The system of claim 8 wherein the plurality of sensors in each cable are arranged in at least two groups, each group configured to operate on a unique wavelength of light, an input of the optical sensors in each group functionally coupled at an input end thereof to each of the primary light source fibers and the auxiliary light source fibers by a wavelength drop having the unique wavelength associated with each group.

12. The system of claim 8 wherein each of the groups of sensors in each cable comprises optical splitters and optical couplers configured to enable frequency division multiplex telemetry interrogation of each individual sensor in each of the groups of sensors.

13. The system of claim 8 wherein each of the groups of sensors in each cable comprises optical splitters and optical couplers configured to enable time division multiplex telemetry interrogation of each individual sensor in each of the groups of sensors.

14. The system of claim 8 wherein the at least one primary signal return fiber includes at least one optical amplifier therein arranged with an output thereof in a first direction, and wherein the at least one auxiliary signal return fiber includes at least one optical amplifier therein arranged with an output thereof in a direction opposed to the first direction.

15. The system of claim 12 wherein the at least one optical amplifier in each of the at least one primary and auxiliary signal return fibers comprises an erbium doped fiber amplifier.

16. The system of claim 8 wherein the optical sensors comprise optical seismic sensors.

17. The system of claim 8 wherein an end of the primary source light fiber in each of the cables opposed to the end coupled to the jumper cable is in optical communication with a light source.

18. The system of claim of claim 8 wherein an end of the primary signal return fiber in each of the cables opposed to the end coupled to the jumper cable is in optical communication with a photodetector.

19. An optical sensor cable, comprising:
at least one light source fiber extending substantially the entire length of the cable;
a plurality of optical sensors functionally coupled at an input thereof to each of the at least one light source fiber; and
at least one signal return fiber extending substantially along the entire length of the cable and functionally coupled to an output of each of the optical sensors; and
wherein the at least one source light fiber and the at least one signal return fiber are configured to be coupled at either end thereof to a respective one of a light source and a photodetection device.

20. The optical sensor cable of claim 17 wherein the plurality of sensors are arranged in at least two groups, each group configured to operate on a unique wavelength(s) of light, an input of the optical sensors in each group functionally coupled at an input end thereof to the primary light source fiber by a first and a second wavelength drop filter(s) each having the unique wavelength(s) associated with each group, the first and second wavelength drop filters in opposed optical direction with respect to the source light fiber.

21. The optical sensor cable of claim 17 wherein each of the groups of sensors comprises optical splitters configured to enable frequency division multiplex telemetry interrogation of each individual sensor in each of the groups of sensors.

22. The optical sensor cable of claim 17 wherein each of the groups of sensors comprises optical splitters configured to enable time division multiplex telemetry interrogation of each individual sensor in each of the groups of sensors.

23. The optical sensor cable of claim 17 further comprising at least one optical amplifier in the at least one signal return fiber.

24. The optical sensor cable of claim 20 wherein the at least one optical amplifier comprises an erbium doped optical fiber amplifier.

25. The optical sensor cable of claim 20 further comprising a bull plug removably attachable to an end of the cable.

26. The optical sensor cable of claim 20 wherein the optical sensors comprise optical seismic sensors.

* * * * *